(12) United States Patent
Buliga et al.

(10) Patent No.: US 10,044,417 B2
(45) Date of Patent: Aug. 7, 2018

(54) SYSTEMS AND METHODS FOR RRU CONTROL MESSAGING ARCHITECTURE FOR MASSIVE MIMO SYSTEMS

(71) Applicant: Huawei Technologies Co., Ltd., Shenzhen (CN)

(72) Inventors: Andrei Buliga, Ottawa (CA); Lan Hu, Ottawa (CA); Sai Mohan Kilambi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/793,349

(22) Filed: Jul. 7, 2015

(65) Prior Publication Data

US 2017/0012681 A1   Jan. 12, 2017

(51) Int. Cl.
*H04B 7/0413*   (2017.01)
*H04B 1/18*   (2006.01)
*H04L 5/00*   (2006.01)
*H04L 27/04*   (2006.01)
*H04L 27/06*   (2006.01)

(52) U.S. Cl.
CPC ............ *H04B 7/0413* (2013.01); *H04B 1/18* (2013.01); *H04L 5/0053* (2013.01); *H04L 27/04* (2013.01); *H04L 27/06* (2013.01)

(58) Field of Classification Search
CPC ... H04B 1/16; H04B 1/18; H04B 1/38; H04B 1/40; H04B 7/02; H04B 7/04; H04B 7/0404; H04B 7/0408; H04B 7/0413; H04B 7/0452; H04B 7/06; H04B 7/08; H04L 27/04; H04L 27/06

USPC ....... 375/219, 220, 222, 260–262, 265, 267; 370/208, 210, 254, 277, 278, 282, 310, 370/310.2, 328, 334, 338; 455/500, 61, 455/63.4, 73, 78, 88
See application file for complete search history.

(56) References Cited

U.S. PATENT DOCUMENTS

2005/0007993 A1\* 1/2005 Chambers ............... H04L 12/66
370/349
2006/0291407 A1 12/2006 Johnson et al.
(Continued)

FOREIGN PATENT DOCUMENTS

CN    101136811 A    3/2008
CN    101931540 A    12/2010
(Continued)

*Primary Examiner* — Young T Tse
(74) *Attorney, Agent, or Firm* — Slater Matsil, LLP (57) ABSTRACT

System and method embodiments are provided for remote radio unit (RRU) control messaging in massive multiple input multiple output (MIMO) systems. In an embodiment, a network component in a MIMO wireless communication system includes a digital transceiver configured to generate a data signal and a control signal, the control signal including one of control information to control analog components on a RRU and status information about analog components on the RRU; a modulator configured to modulate the control signal onto a control carrier; a transmit filter configured to filter the modulated control signal; and a combiner configured to combine the data signal and the filtered modulated control signal and send the combined signal to a second network component via a physical channel, the second network component comprising one of a controller and the RRU.

19 Claims, 7 Drawing Sheets

(56) References Cited

U.S. PATENT DOCUMENTS

| | | | | |
|---|---|---|---|---|
| 2007/0030116 A1* | 2/2007 | Feher | ................... | H04M 3/382 340/5.53 |
| 2013/0100907 A1 | 4/2013 | Liu | | |
| 2014/0072298 A1 | 3/2014 | Hou | | |
| 2014/0161438 A1* | 6/2014 | In De Betou | ......... | H04W 24/04 398/5 |

FOREIGN PATENT DOCUMENTS

| | | |
|---|---|---|
| CN | 102315880 A | 1/2012 |
| CN | 102546080 A | 7/2012 |
| CN | 103684604 A | 3/2014 |
| KR | 100790655 B1 | 1/2008 |
| WO | 2008033076 A1 | 3/2008 |

\* cited by examiner

SYSTEMS AND METHODS FOR RRU CONTROL MESSAGING ARCHITECTURE FOR MASSIVE MIMO SYSTEMS

TECHNICAL FIELD

The present invention relates to a system and method for wireless communications, and, in particular embodiments, to a system and method for control messaging in massive multiple input multiple output radio systems.

BACKGROUND

A massive Multiple Input Multiple Output (MIMO) system consists of multiple remote radio units (RRUs). These RRUs can be sourced by a centralized digital transceiver unit that can be located a few kilometers away. Since there is hardware on the RRU that needs to be controlled according to the data being sent, there needs to be a mechanism to transfer control information from the digital unit such that the hardware complexity at the RRU does not increase too much.

Hardware on the RRU includes (but is not limited to) a power amplifier (PA), switches, automatic gain controls (AGCs), antenna calibration units, and antenna systems.

Current RRUs are not massive MIMO and, hence require significantly less hardware cost for control. However, the current solutions may not be scalable for massive MIMO.

SUMMARY OF THE INVENTION

In accordance with an embodiment, a network component in a MIMO wireless communication system includes a digital transceiver configured to generate a data signal and a control signal, the control signal including one of control information to control analog components on a RRU and status information about analog components on the RRU; a modulator configured to modulate the control signal onto a control carrier; a transmit filter configured to filter the modulated control signal; and a combiner configured to combine the data signal and the filtered modulated control signal and send the combined signal to a second network component via a physical channel, the second network component comprising one of a controller and the RRU.

In accordance with another embodiment, a method in a network component for controlling a remote radio unit (RRU) in a multiple input multiple output (MIMO) system includes modulating, with a transceiver, a control signal to produce a modulated control signal, wherein the control signal comprises one of control information to control analog components on the RRU and status information about analog components on the RRU; combining, with the transceiver, the modulated control signal with a data signal to produce a combined signal; and transmitting the combined signal to a second network component via a physical channel.

In accordance with another embodiment, a method in a first network component for receiving control and/or status signals from a second network component includes receiving, at the first network component, a combined signal from the second network component on a physical channel, wherein the combined signal comprises data and one of RRU control information for controlling analog components on the RRU and RRU status information about analog components on the RRU; splitting, by the first network component, the combined signal into a first signal and a second signal; processing, by the first network component, the first signal through data processing components and transmitting the data; and passing, by the first network component, the second signal through a low pass filter or a band pass filter to obtain one of the RRU control information and the RRU status information.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A massive MIMO system includes multiple RRUs. These RRUs can be sourced by a centralized digital transceiver unit that can be located a few kilometers (kms) away. Since there is hardware on the RRU that needs to be controlled according to the data being sent, it has been found that it is desirable to have a mechanism to transfer control information from the digital transceiver unit to the RRU such that the hardware complexity at the RRU does not increase too much.

Disclosed herein is a control messaging system that transfers control information from the digital transceiver to the RRU and back for a massive MIMO system in a cost effective way. No separate physical channel is required to send and receive control information. In an embodiment, the control message decoder circuitry on the RRU does not need an additional local oscillator (LO) to demodulate the control message.

Disclosed herein are embodiments of a high capacity base-station system based on Massive MIMO. Embodiments of this system include multiple RRUs (not shown) that can be sourced by a single (or multiple) digital/analog transceiver system located a few kms away (and not necessarily near the tower). In such a scenario, control information needs to be transmitted along with the data to the RRU over long distances. One challenge is to do this with minimal hardware resource cost and by preferably leveraging the already existing infrastructure for the data signals. Also, it is desirable that the RRU be relatively less complex. For instance, if the data is modulated onto an optical fiber for transmission from the digital/analog transceiver to the RRU, then it is wasteful to lay a different fiber to transmit and receive the remote radio control information. This problem is even worse in high-bandwidth multiband signals where the control information cannot be placed in-band, where current systems require a different fiber to transmit and receive the remote radio control information. In this disclosure, an embodiment method is described wherein the control information is transmitted using simple Amplitude Shift Keying (ASK) modulation which gets detected on the RRU and processed using a digital chip (for instance a low resource field programmable gate array (FPGA)). Embodiment control message formats are also described. The modulation format is configurable in that, in an embodiment, changing the carrier of the modulation is just a software configuration.

The disclosed systems and methods provide a low complexity solution to transport control data from the digital transceiver to multiple RRUs. In an embodiment, the disclosed system uses a very simple modulation scheme that does not require any additional local oscillators on the RRU for carrier detection. In addition, in some embodiments, the RRU reuses the onboard clock generator circuit to send control/status information back to the digital transceiver. The carrier frequency of the control frame is programmable via software. Embodiments of the disclosed systems and methods are scalable depending on the needs of the enterprise deploying the system.

One disclosed embodiment of a network component in a MIMO wireless communication system includes a digital transceiver configured to generate a data signal and a control signal, the control signal including one of control information to control analog components on a RRU and status information about analog components on the RRU; a modulator configured to modulate the control signal onto a control carrier; a transmit filter configured to filter the modulated control signal; and a combiner configured to combine the data signal and the filtered modulated control signal and send the combined signal to a second network component via a physical channel, the second network component comprising one of a controller and the RRU. The network component can be a transceiver controller or an RRU. In an embodiment, the transmit filter is a low pass filter or a band pass filter. The modulator is configured to perform one of on-off keying (OOK) modulation, ASK modulation, and single side band (SSB) modulation. In an embodiment, the network component further also includes a directional coupler configured to receive a combined signal from the second network component and split the combined signal into first and second signals; a first receive filter configured to receive the first signal from the directional coupler and extract data from the first signal; a demodulator configured to receive the second signal from the directional coupler via a second receive filter, wherein the demodulator is configured to extract control/status information from the second signal. The combined signal may include a plurality of received data signals from a massive MIMO antenna system. In an embodiment, the second receive filter is a low pass filter or a band pass filter. The demodulator may be configured to perform at least one of OOK demodulation, ASK demodulation, and SSB demodulation. In an embodiment, the network component comprises is the RRU and also includes a control unit configure to control components within the RRU according to the control information. The control unit may be a FPGA. In an embodiment, the network component also includes an antenna for receiving data; a modulator configured to receive status information from the control unit and modulate the status information onto a carrier signal generated by a carrier and clock generator; and a combiner to combine the modulated status information and the data into a single signal for transmission to the transceiver via a second physical channel. The data signal may include a plurality of data signals for transmission by a massive MIMO antenna system. In an embodiment, the modulator is a FPGA clock generator.

One disclosed embodiment of a method in a network component for controlling a RRU in a MIMO system includes modulating, with a transceiver, a control signal to produce a modulated control signal, wherein the control signal comprises one of control information to control analog components on the RRU and status information about analog components on the RRU; combining, with the transceiver, the modulated control signal with a data signal to produce a combined signal; and transmitting the combined signal to a second network component via a physical channel. In an embodiment, the method also includes receiving a received combined signal from the second network component via the physical channel, wherein the received combined signal comprises a received data signal and one of the control information and the status information; splitting the received combined signal into a first signal and a second signal; passing the first signal through a band pass filter to obtain the received data signal; and passing the second signal through a low pass filter or a band pass filter to obtain one of the control information and the status information. A control carrier for the one of the control information and the status information is detected without using a LO. In an embodiment, modulating the control signal includes using one of OOK modulation, ASK modulation, and SSB modulation. Combining the modulated control signal with the data signal may include passing the modulated control signal through a low pass filter or a band pass filter.

One disclosed embodiment of a method in a first network component for receiving control and/or status signals from a second network component includes receiving, at the first network component, a combined signal from the second network component on a physical channel, wherein the combined signal comprises data and one of RRU control information for controlling analog components on the RRU and RRU status information about analog components on the RRU; splitting, by the first network component, the combined signal into a first signal and a second signal; processing, by the first network component, the first signal through data processing components and transmitting the data; and passing, by the first network component, the second signal through a low pass filter or a band pass filter to obtain one of the RRU control information and the RRU status information. In an embodiment, the method also includes modulating, with the first network component, a control/status signal to produce a modulated control/status signal, wherein the control/status signal comprises one of control information to control analog components on the RRU and status information about analog components on the RRU; combining, with the first network component, the modulated control/status signal with a received data signal to produce a second combined signal; and transmitting, with the first network component, the second combined signal to the second network component via the physical channel. A modulated carrier for the one of the RRU control information and the RRU status information may be detected without using a LO. In an embodiment, modulating the control/status signal includes using one of OOK modulation, ASK modulation, and SSB modulation.

One disclosed embodiment system for wireless transmission includes a transceiver; a RRU; and a data transport layer providing a communication link between the transceiver and the RRU; wherein the transceiver and the RRU are configured to exchange data, control information, and status information via the data transport layer without use of a separate physical channel to exchange the control information and the status information. The transceiver includes a digital transceiver that generates the control information, a modulator configured to modulate the control information received from the digital transceiver, and a combiner coupled to the modulator by a low pass filter, wherein the combiner is configured to combine the modulated control information received from the low pass filter with the data for transmission to the RRU via the data transport layer. The modulator is configured to perform at least one of OOK or ASK, or any other suitable modulation method. The transceiver may also include a directional coupler configured to receive a combined signal from the RRU and split the combined signal into first and second signals, a first filter configured to receive the first signal from the directional coupler and extract the data from the first signal, a demodulator coupled to thee directional coupler via a second filter, wherein the demodulator is configured to extract control/status information from the second signal. The RRU includes a directional coupler to split a combined signal received from the transceiver via the data transport layer into a first signal and a second signal, an antenna coupled to the directional coupler via data signal processing components and configured to transmit the data obtained from the first signal, and a demodulator coupled to the directional coupler via a RRU control information filter, wherein the demodulator is configured to extract control information from the second signal after the second signal has passed through the RRU control information filter. The RRU may also include an antenna for receiving data, a control unit for controlling components within the RRU, a modulator configured to receive control or status information from the control unit, and a combiner to combine modulated control or status information and data into a single signal for transmission to the transceiver via the data transport layer. In one embodiment, the RRU control information filter is a low pass filter or a band pass filter. The control unit may be a FPGA and the modulator may be a FPGA clock generator.

One disclosed method for controlling a RRU in a MIMO system includes modulating, with a transceiver, a control signal to produce a modulated control signal, wherein the control signal includes control information to control analog components on the RRU; combining, with the transceiver, the modulated control signal with a data signal to produce a combined signal; and transmitting the combined signal to the RRU via a data transport layer, wherein the control information is transmitted to the RRU without use of a separate control layer. The method may also include receiving a combined signal from the RRU via the data transport layer, wherein the received combined signal includes a received data signal and RRU control/status messages; splitting the received combined signal into a first signal and a second signal; passing the first signal through a band pass filter to obtain the received data signal; and passing the second signal through a low pass filter or a band pass filter to obtain the RRU control/status messages. A modulated carrier for the RRU control/status messages is detected without using a LO. Modulating the control signal includes using OOK, ASK, or other modulation methods. Combining the modulated control signal with the data signal may include passing the modulated control signal through a low pass filter or band pass filter.

One embodiment method for receiving control signals from a transceiver includes receiving a combined signal from the transceiver on a data transport layer, wherein the combined signal includes data and RRU control information; splitting the combined signal into a first signal and a second signal; processing the first signal through data processing components and transmitting the data; and passing the second signal through a low pass filter or a band pass filter to obtain the RRU control information, wherein the control information is received by the RRU without use of a separate physical channel. The method may also include modulating, with the RRU, a control/status signal to produce a modulated control/status signal, wherein the control/status signal includes control information or status information about analog components on the RRU; combining, with the RRU, the modulated control/status signal with a received data signal to produce a combined signal; and transmitting, with the RRU, the combined signal to the transceiver via a data transport layer, wherein the control/status information is transmitted to the transceiver without use of a separate control layer. The control carrier for the RRU control information is detected without using a LO. Modulating the control/status signal includes using OOK, ASK, SSB modulation, and/or other modulation method.

Figure 1:
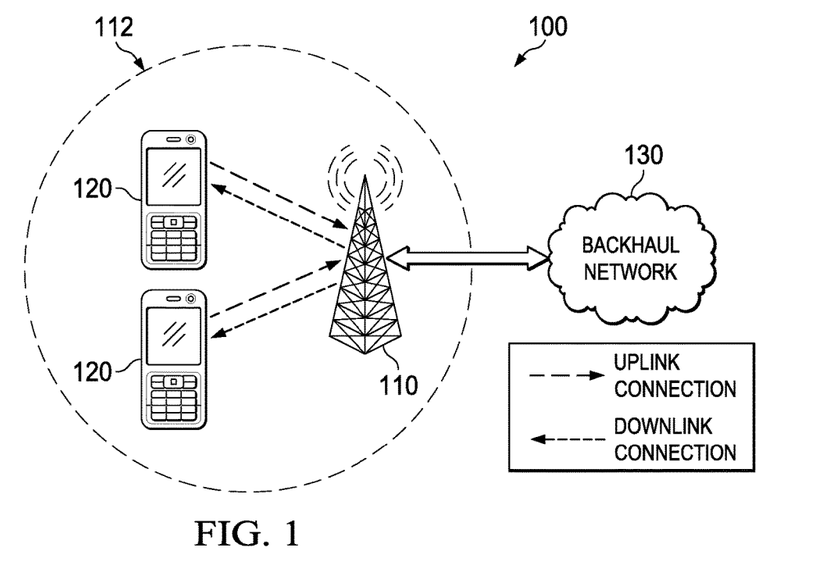
FIG. 1 illustrates a network for communicating data.

FIG. 1 illustrates a network 100 for communicating data. The network 100 includes an access point (AP) 110 having a coverage area 112, a plurality of user equipment (UEs) 120, and a backhaul network 130. As used herein, the term AP may also be referred to as a TP and the two terms may be used interchangeably throughout this disclosure. The AP 110 may include any component capable of providing wireless access by, inter alia, establishing uplink (dashed line) and/or downlink (dotted line) connections with the UEs 120, such as a base transceiver station (BTS), an evolved Node B (eNB), a femtocell, and other wirelessly enabled devices. The UEs 120 may include any component capable of establishing a wireless connection with the AP 110. The backhaul network 130 may be any component or collection of components that allow data to be exchanged between the AP 110 and a remote end (not shown). In some embodiments, the network 100 may include various other wireless devices, such as relays, femtocells, etc.

In an embodiment, network 100 is a massive MIMO system 100. A massive MIMO system may also be referred to as a large-scale antenna system, very large MIMO, hyper MIMO, full-dimension MIMO, and ARGOS. In an embodiment, a massive MIMO system may include a large number of service antennas. The number of antennas may be on the order of hundreds or thousands. The antennas are operated coherently and adaptively. Extra antennas help improve the efficiency of a wireless system by focusing the transmission and reception of signal energy into small regions of space. Embodiment MIMO systems improve throughput and energy efficiency as compared to existing MIMO systems.

Figure 2:
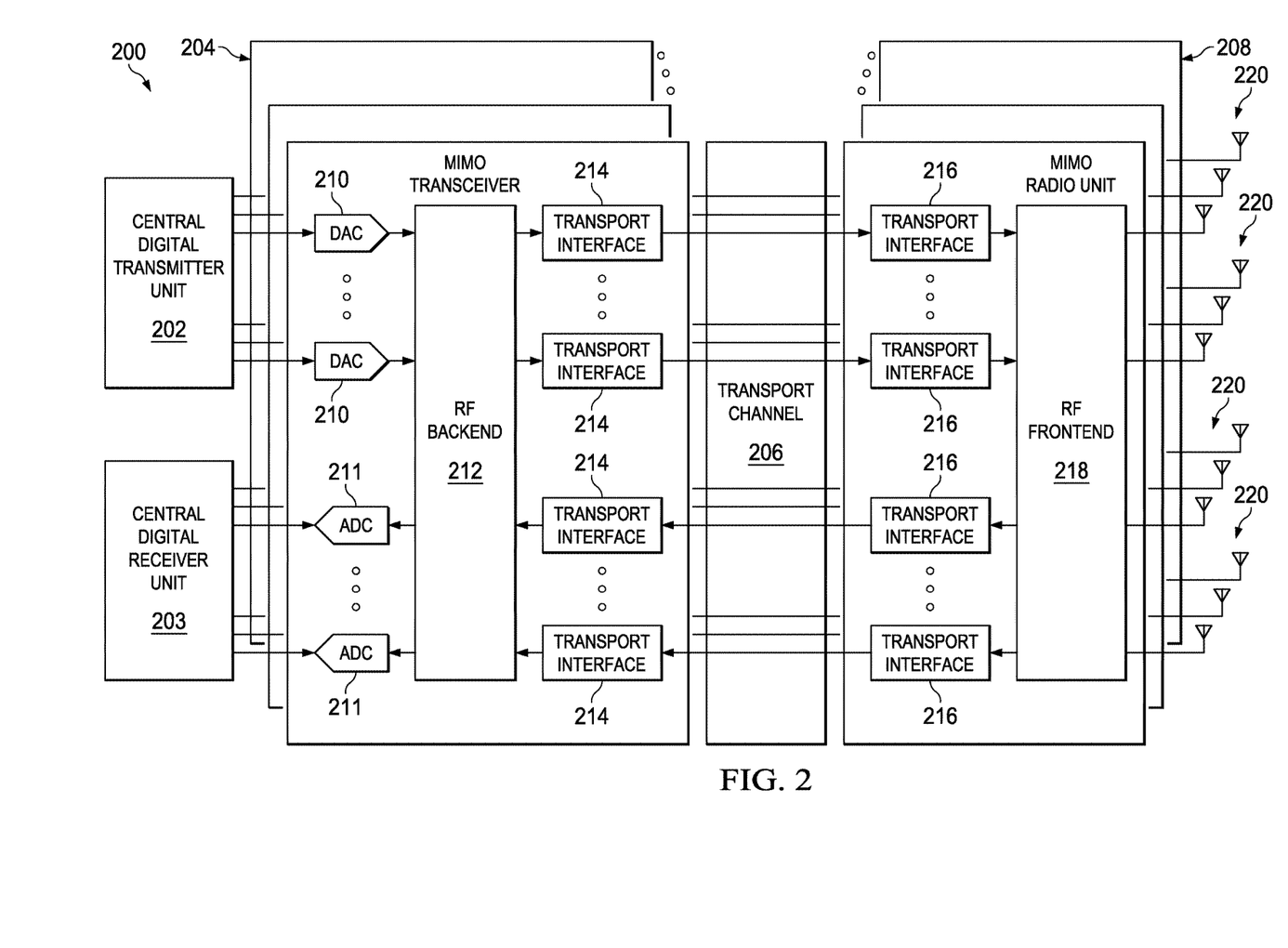
FIG. 2 is a block diagram of an embodiment of a high capacity base-station system based on massive MIMO.

FIG. 2 is a block diagram of an embodiment of a high capacity base-station system 200 based on massive MIMO. System 200 may be implemented as, for example, AP 110 in FIG. 1. System 200 includes a central digital transmitter unit 202, a central digital receiver unit 203, a plurality of MIMO transceivers 204, and a plurality of MIMO radio units 208 connected to the MIMO transceivers 204 by a transport channel 206. Each MIMO transceiver 204 includes a plurality of digital-to-analog converters (DACs) 210, a radio frequency (RF) backend 212, a plurality of transport interfaces 214, and a plurality of analog-to-digital converters (ADCs) 211. Each MIMO radio unit 208 includes a plurality of transport interfaces 216, an RF frontend 219, and a plurality of antenna elements 220. In an embodiment, the MIMO transceiver 204 is located remote to the MIMO radio unit 208. In an embodiment, the MIMO transceiver 204 is located at least 100 meters (m) from the MIMO radio unit 208. In an embodiment, the MIMO transceiver 204 is located up to several kms away from the MIMO radio unit 208 and the MIMO transceiver 204 is not necessarily on or near a radio tower on which the MIMO radio unit 208 may be mounted. In an embodiment, the MIMO radio unit 208 is an RRU.

The DACs 210 are connected to the central digital transmitter unit 202. The DACs 210 receive a digital signal from the central digital transmitter unit 202 and converts the signal to an analog signal. The DACs 210 then provide the signal from the central digital transmitter unit 202 to the RF backend 212. The RF backend transmits the signal via the transport interface 214 over the transport channel 206 to the MIMO radio unit 208. The MIMO radio unit 208 receives signals from the MIMO transceiver 204 via the transport channel 206 at the transport interface 216. The transport interface 216 provides the signal to the RF frontend 218 which then provides the signal to one or more antenna elements 220 for wireless transmission.

The antenna elements 220 also receive signals and transmit the signals to the RF frontend 218 which forwards the signals via the transport interface 216 over the transport channel 206 to the MIMO transceiver 204. The MIMO transceiver 204 receives the signals from the MIMO radio unit 208 via the transport channel 206 at the transport interface 214. The transport interface 214 provides the signal to the RF backend 212 which then provides the signal to an ADC 210. The ADC 210 coverts the signal to a digital signal and provides the digital signal to the central digital receiver unit 203.

In an embodiment, the transport channel 206 includes one or more fiber optic cables. In an embodiment, the transport channel 206 includes electrically conducting cables. In an embodiment, the transport channel 206 includes a wireless channel. In an embodiment, the transport channel 206 includes one optical link for transmission and one optical link for reception.

Control information is transmitted from the MIMO transceiver 204 to the MIMO radio unit 208 using the same transport channel 206 hardware used by the data. In an embodiment, the control information is transmitted using a simple ASK modulation which is detected on the MIMO radio unit 208 and processed using, for example, a digital chip (e.g., a low resource FPGA). In an embodiment, the modulation format is configurable.

In an embodiment, the control message (i.e., control signal) transporting the control information operates at a very low frequency rate as compared to the data signal. Therefore, it is wasteful to up-sample the control signals to be added onto the data signal. In an embodiment, a simple control message frame is constructed and serialized. The serialized control message is modulated using a modulation scheme, such as, for example, OOK. The modulated control signal is combined with the data signal in the analog domain and transmitted over the transport channel 206.

On the MIMO radio unit 208, a filter is used to select the control signal. The control signal is then demodulated and processed by a digital chip, which, in turn, controls the analog components on the MIMO radio unit 208.

In an embodiment, a synchronization (sync) preamble is added, since the data is serialized, so that a "start of control frame" can be detected on the MIMO radio unit 208. A similar methodology is used for transferring control and status information from the MIMO radio unit 208 to the MIMO transceiver 204.

Figure 3:
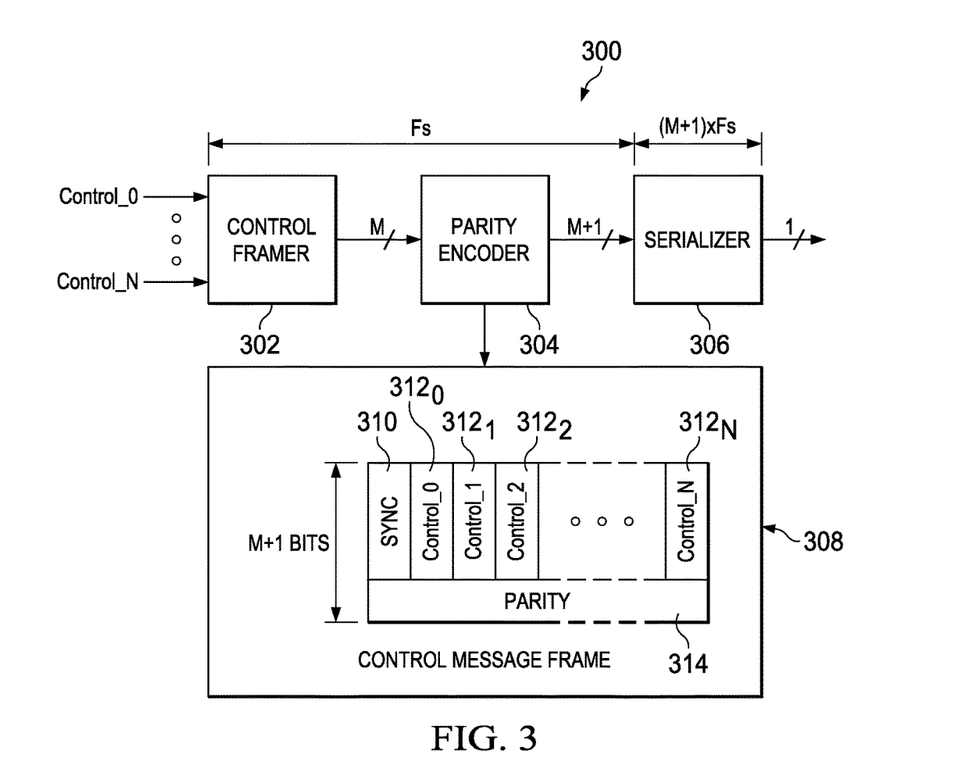
FIG. 3 is a block diagram of an embodiment control framing system.

FIG. 3 is a block diagram of an embodiment control framing system 300. The control signals shown here are just used as examples and can be scaled depending on the needs of the system 300. System 300 includes a control framer 302, a parity encoder 304, and a serializer 306. The control framer 302 frames control signals control_0 through control_N and sends M control frames to parity encoder 304. The parity encoder 304 (or any other form of coding) encodes parity into the control message frames 308 and sends M+1 control message frames 308 to serializer 306 which serializes the control frames 308. The control signals are framed and parity encoded within a sampling rate, $F_s$, of the control signals which, in an embodiment, is around a few megahertz (MHz). The serializer 306 serializes the control message frames 308 in a time of about $(M+1) \times F_s$. In another embodiment, the serializer 306 serializes the control message frames 308 in a time of about $(M+N) \times F$. The control message frame 308 includes M+1 bits and includes a sync field 310, a parity field 314, and control fields 312 each corresponding to a respective one of the control signals (control_0 through control_N).

Figure 4:
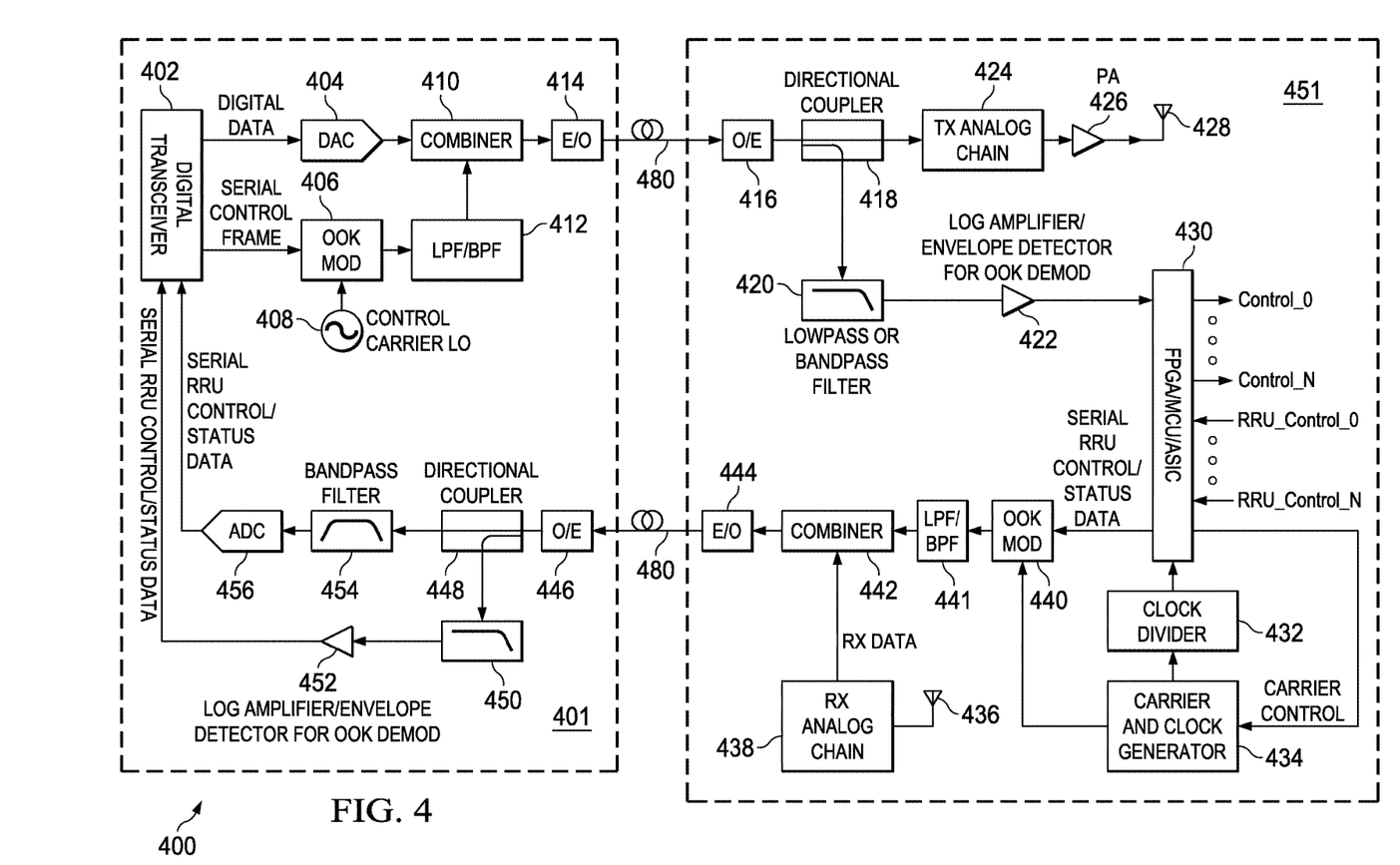
FIG. 4 is a block diagram of an embodiment of an RRU control messaging system for a massive MIMO system.

FIG. 4 is a block diagram of an embodiment of an RRU control messaging system 400 for a massive MIMO system. System 400 includes transceiver unit 401 and an RRU 451 coupled by a transport channel 480. The transceiver unit 401 includes a digital transceiver 402, a DAC 404, an OOK modulator 406, a control carrier LO 408, a combiner 410, a low pass filter (LPF)/band pass filter (BPF) 412, an electrical-to-optical converter (E/O) 414, an optical-to-electrical converter (O/E) 446, a directional coupler 448, a band pass filter 454, a low pass filter 450, a log amplifier/envelope detector 452, and an ADC 456. The RRU 451 includes an O/E 416, a direction coupler 418, a low pass (or band pass) filter 420, a log amplifier/envelope detector 422, a TX analog chain 424, a PA 426, an antenna 428, an FPGA/MCU/ASIC 430, a clock divider 432, a carrier and clock generator 434, an antenna 436, an RX analog chain 438, an OOK modulator 440, a LPF/BPF 441, a combiner 442, and an E/O 444. The LPF/BPF 412 and/or the LPF/BPF 441 may be either a LPF or a BPF. The clock divider 432 may be used to bring the carrier frequency down to the suitable frequency level for the FPGA/MCU/ASIC operation. In an embodiment, one or both of the LPF 412 and the LPF 450 may be replaced with a band pass filter. The log amplifier/envelope detector 422 and the log amplifier/envelope detector 452 may be either a log amplifier or an envelope detector.

The digital transceiver 402 provides digital data to the DAC 404 and serial control frame to the OOK modulator 406. The OOK modulator 406 modulates the serial control frame onto a control carrier produced by control carrier LO 408. The modulated serial control frame is provided to the LPF/BPF 412 and then combined with the analog data produced by DAC 404 at the combiner 410. The combined data and control signal is provided to the E/O 414 which converts the electrical signal into an optical signal and transmits the optical signal to the RRU 451 over the transport channel 480. In an embodiment, the transport channel 480 includes one or more fiber optic cables or waveguides. In an embodiment, the transport channel 480 includes at least one fiber optic cable for transmissions from the transceiver unit 401 to the RRU 451 and at least one fiber optic cable for transmission from the RRU 451 to the transceiver unit 401. In other embodiments, the transport channel 480 is an electrical connection provided by, for example, electrically conducting wires, coaxial cable, or an electrical waveguide. In an embodiment, the transport channel 480 is a wireless link, but a wireless link adds complexity to the system and may require a change in the modulation scheme for the control message.

The O/E 416 in the RRU 451 receives the optical signal from the transceiver unit 401 and converts the optical signal into an electrical signal. The electrical signal is split by the directional coupler 418 into a first signal and a second signal. In an embodiment, the first and second signal are identical to each other, but in other embodiments, the power split is not equal. In an embodiment, the directional coupler 418 is a diplexer or a multiplexer. The first signal is transmitted to the TX analog chain 424, then to the PA 426, and then to the antenna 428 for wireless transmission. The second signal is sampled by the directional coupler 418 and is sent to the low pass (or band pass) filter 420 which filters the data signal from the second signal leaving only a modulated control signal. The modulated control signal is sent to the log amplifier/envelope detector 422 for demodulation (e.g., OOK demodulation). The demodulated control signal is then sent from the log amplifier/envelope detector 422 to the FPGA/MCU/ASIC 430. The FPGA/MCU/ASIC 430 provides control signals to various components within the RRU 451 based on the control information received from the transceiver 401. Examples of control signals include AGC control signals, power detection, switch control, and antenna calibration signals. The control message decoder circuitry (e.g., the directional coupler 418, filter 420, and log amplifier/envelope detector 422) do not need an additional LO for modulated control carrier detection. This is an artifact of the modulation technique used.

The FPGA/MCU/ASIC 430 also receives control/status messages from various components in the RRU 451. The control/status messages include data (e.g., information) about the status and/or activities of the various components controlled by the FPGA/MCU/ASIC 430. Examples of control/status messages include temperature alarms, control signal detection alarms, etc. The FPGA/MCU/ASIC 430 sends carrier control information to the carrier and clock generator 434. Carrier control allows for change of carrier frequency if needed. The carrier and clock generator 434 provides timing signals to the clock divider 432. The clock divider brings the carrier frequency to a suitable frequency for FPGA/MCU/ASIC operation. Serial RRU control/status data or information received is transmitted from the FPGA/MCU/ASIC to the modulator 440. The serial RRU control/status data is data generated by the FPGA/MCU/ASIC 430 based on control signals received back from the various components that the FPGA/MCU/ASIC 430 controls. The modulator 440 modulates the serial RRU control/status data based on the carrier and clock generator 434. Thus, since the RRU 451 reuses the carrier and clock generator 434 (i.e., the FPGA clock generator) for control message modulation from the RRU 451 to the transceiver 401, an extra LO is not needed to send control/status information back to the transceiver 401. The control message carrier can be programmed to any location via control message frames, thus, no hardware change is necessary.

Data from antenna 436 is received and processed by receiver analog chain 438. In some embodiments, antenna 436 may be a separate antenna from antenna 428. In other embodiments, antenna 436 and antenna 428 are the same antenna. For example, in an embodiment antenna 436 and antenna 428 are the same for TDD operation and are separate for FDD operation. Each of antennas 428, 436 may include multiple antennas or antenna (e.g., radiating) elements. The modulated control/status data from the modulator 440 and the receiver data from the RX analog chain 438 are combined into a single combined signal by combiner 442. The combined signal is converted into an optical signal by E/O 444 for transmission by the data transport plane 480 to the transceiver 401.

The O/E 446 in the transceiver 401 receives the combined signal from the RRU 451 via the data transport plane 480 and converts the combined signal from an optical signal into an electrical signal. The electrical signal is split by the directional coupler 448 into a first received signal and a second received signal. The first and second received signals are identical to each other. In an embodiment, the directional coupler 448 is a diplexer or a multiplexer. The first signal is transmitted to the band pass filter 454 which filters out the control signal leaving only the data signal. The data signal is then sent to the ADC 456 and then to the digital transceiver 402 for further processing. The second signal is sampled by the directional coupler 448 and is sent to the low pass (or band pass) filter 450 which filters the data from the second signal leaving only a modulated control/status signal. The modulated control/status signal is sent to the log amplifier/envelope detector 452 for demodulation (e.g., OOK demodulation) to obtain demodulated serial RRU control/status data which is provided to the digital transceiver 402.

Figure 5:
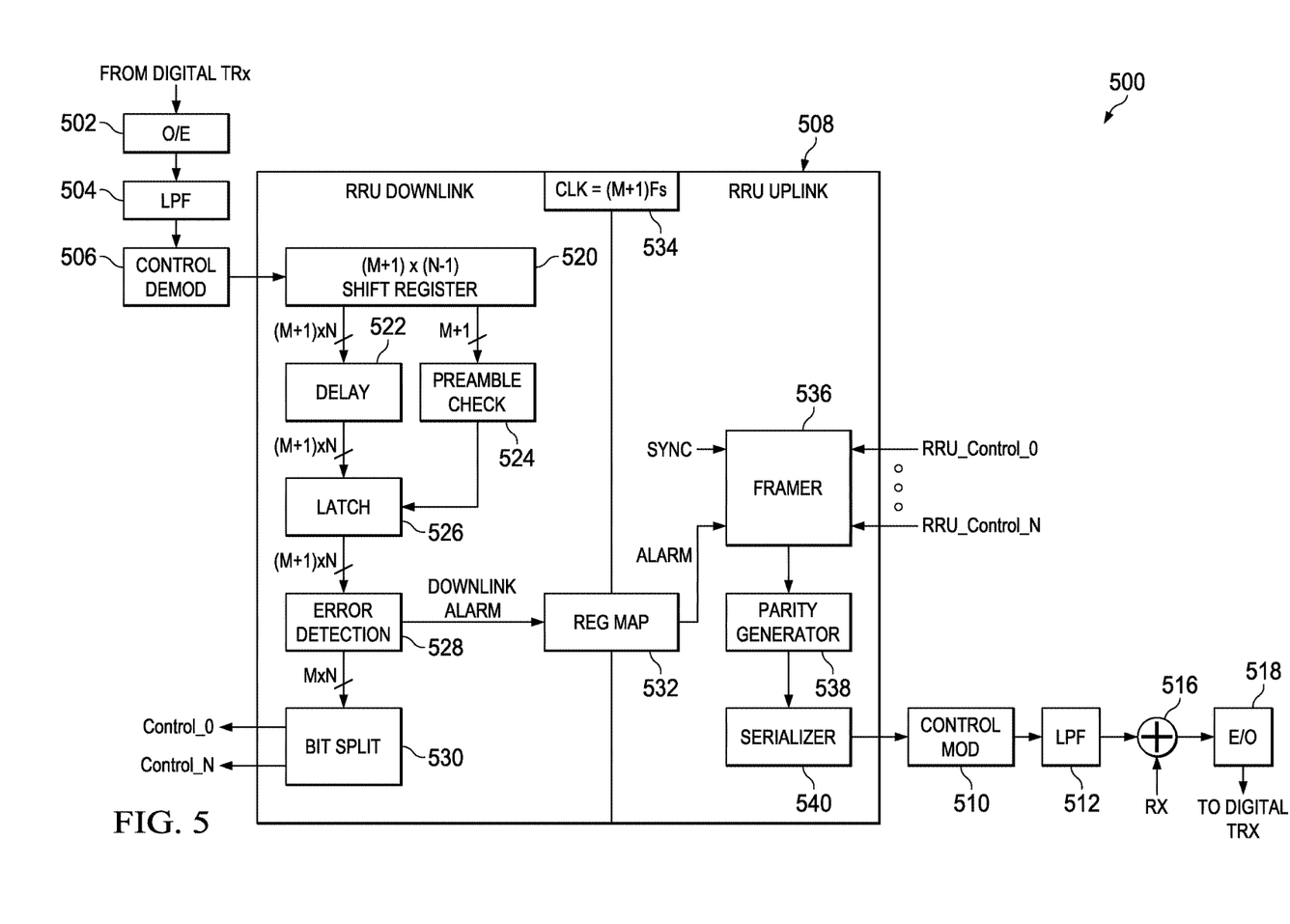
FIG. 5 is a block diagram illustrating an embodiment of an FPGA system.

FIG. 5 is a block diagram illustrating an embodiment of an FPGA system 500. The FPGA system 500 includes an FPGA 508, an O/E 502, a LPF 504, a control signal demodulator 506, a control/status signal modulator 510, a LPF 512, a combiner 516, and an E/O 518. The FPGA 508 receives a demodulated control signal from a transceiver via a data transport channel via the O/E 502, LPF 504, and control signal demodulator 506. The logic for the FPGA 508 includes an (M+1)×(N+1) shift register 520 that receives the demodulated control signal. M+1 outputs from the shift register 520 are provided to a preamble check 524 and (M+1)*N outputs from the shift register 520 are provided to a delay 522. The outputs from the delay 522 and the preamble check 524 are input to latch 526. The (M+1)*N outputs from the latch 526 are fed into an error detection component 528 and M×N outputs from the error detection component 528 are input to a bit split 530. The outputs from the bit split are control signals that are sent to various components controlled by the FPGA 508.

A downlink alarm is sent from the error detection component 528 to a register map 532 which also receives clock pulses from clock 534. A framer 536 receives a synchronization signal, an alarm from the register map 532, and control/status signals from various RRU components. The output from the framer is sent to the parity generator 538 and the output from the parity generator is sent to the serializer 540. The output from the serializer is the control/status message signals that are to be sent back to the transceiver via the control modulator 510, LPF 512, combiner 516 that combines the modulated control/status message signals with the received data, and the E/O 518 that converts the combined signal from an electrical signal to an optical signal for transmission to the transceiver via the data transport plane.

Figure 6:
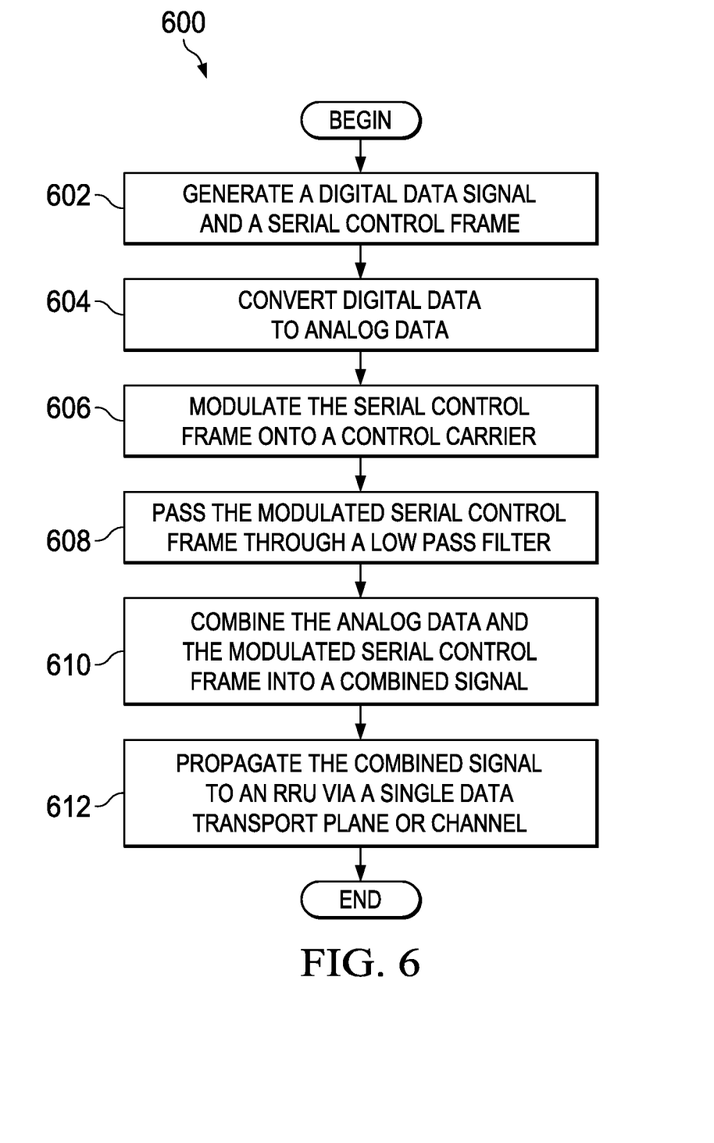
FIG. 6 is a flowchart of an embodiment of a method for transmitting control information from a transceiver to an RRU.

FIG. 6 is a flowchart of an embodiment of a method 600 for transmitting control information from a transceiver to an RRU. The method 600 begins at block 602 where the transceiver generates a digital data signal and a serial control frame. At block 604, the digital data is converted into analog data. At block 606, the serial control frame is modulated onto a modulated carrier. At block 608, the modulated serial control frame is passed through a low pass filter or bandpass filter. At block 610, the analog data and the modulated serial control frame are combined into a combined signal and, at block 612, the combined signal is propagated to an RRU via a single data transport plane or channel, after which the method 600 ends.

Figure 7:
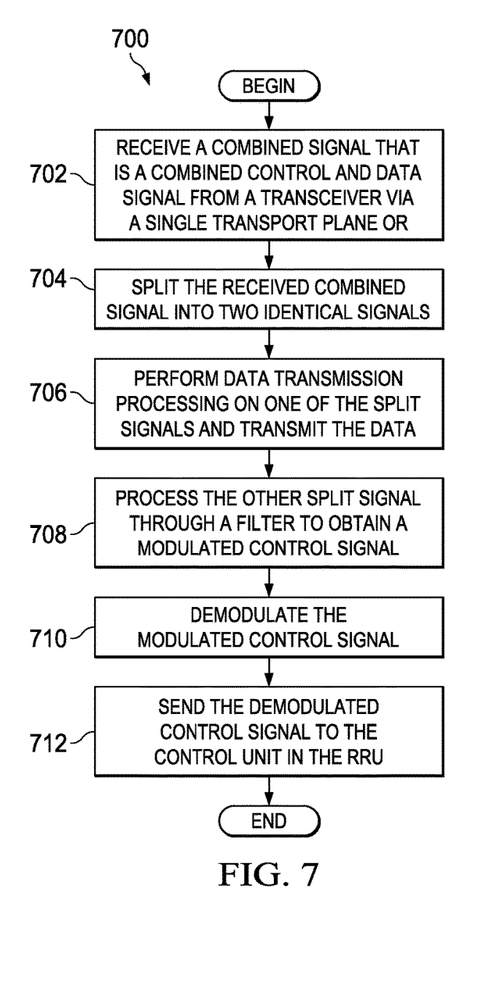
FIG. 7 is a flowchart of an embodiment of a method in an RRU for receiving control information and data from a transceiver via a single transport plane.

FIG. 7 is a flowchart of an embodiment of a method 700 in an RRU for receiving control information and data from a transceiver via a single transport plane. The method 700 begins at block 702 where the RRU receives a combined signal from a transceiver via a single transport plane or channel. The combined signal includes control information and data. At block 704, the received combined signal is split or copied into two identical signals. At block 706, data transmission processing is performed on one of the split signals to obtain the data signal and the data signal is then transmitted via an antenna. At block 708, the other split or copied signal is filtered by a low pass or band pass filter to obtain a modulated control signal. At block 710, the modulated control signal is demodulated and, at block 712, the demodulated control signal is sent to the control unit (e.g., FPGA/MCU/ASIC) in the RRU, after which the method 700 ends.

Figure 8:
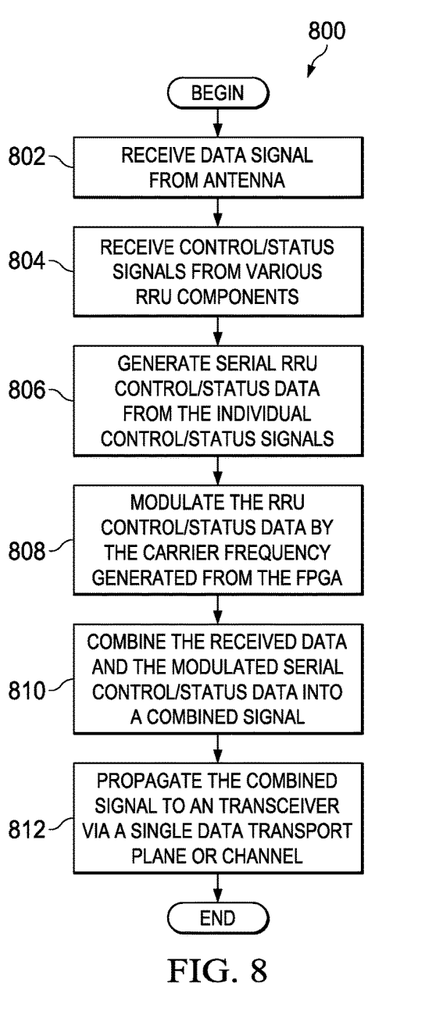
FIG. 8 is a flowchart of an embodiment of a method in an RRU for transmitting received data and control/status information to a transceiver via a single transport plane or channel.

FIG. 8 is a flowchart of an embodiment of a method 800 in an RRU for transmitting received data and control/status information to a transceiver via a single transport plane or channel. The method 800 begins at block 802 where the RRU receives a data signal from the antenna. At block 804, a control unit (e.g., a FPGA/MCU/ASIC) within the RRU receives control/status signals from various RRU components. AT block 806, the control unit generates RRU control/status data or information from the individual control/status signals. At block 808, the RRU control/status data is modulated using the FPGA clock. At block 810, the received data and the modulated serial control/status data are combined into a single combined signal. At block 812, the combined signal is propagated to the transceiver via a single data transport plane or channel, after which the method 800 ends.

Figure 9:
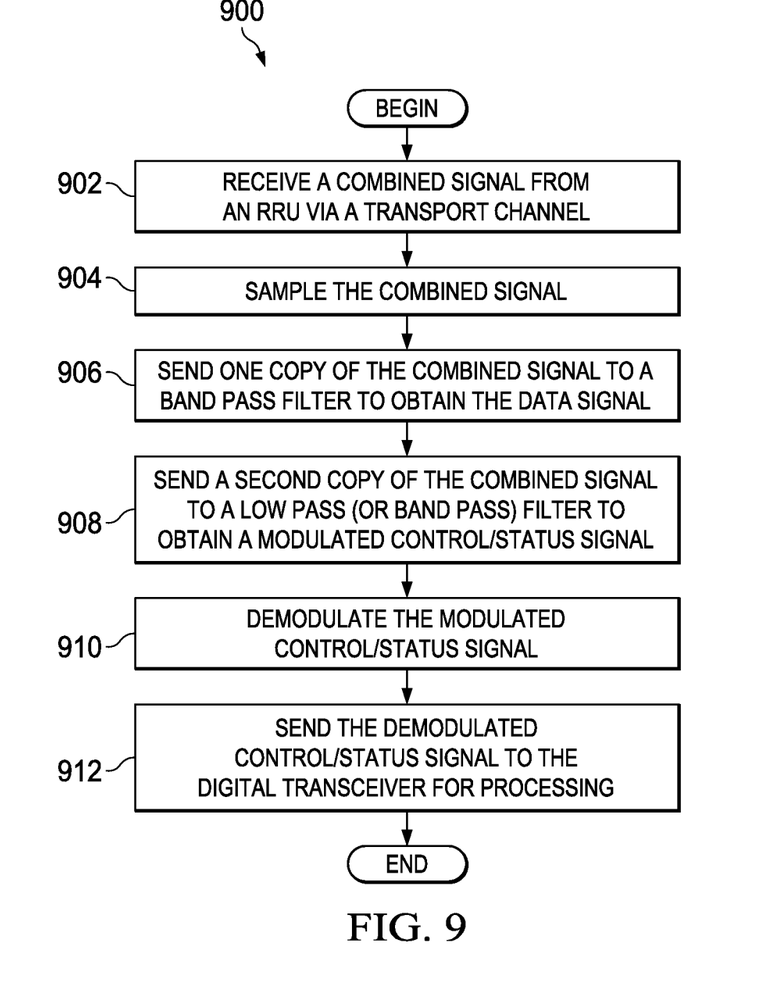
FIG. 9 is a flowchart of an embodiment of a method in a transceiver for receiving data and control/status information from an RRU via a single data transport plane.

FIG. 9 is a flowchart of an embodiment of a method 900 in a transceiver for receiving data and control/status information from an RRU via a single data transport plane. The method 900 begins at block 902 where the transceiver receives a combined signal from the RRU via a transport channel. At block 904, the combined signal is sampled or split into two identical signals. At block 906, one copy of the combined signal is sent to a band pass filter to obtain the data signal and, at block 908, another copy of the combined signal is sent to a different filter (either a low pass filter or a band pass filter) to obtain a modulated control/status signal. At block 910, the modulated control/status signal is demodulated and, at block 912, the demodulated control/status signal is sent to the digital transceiver for processing, after which, the method 900 ends.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A transceiver unit in a massive multiple input, multiple output (MIMO) wireless communication system, the transceiver unit comprising:
   a digital transceiver configured to generate a data signal and a control signal, the control signal including one of control information to control analog components on a remote radio unit (RRU) in the massive MIMO wireless communication system and status information about the analog components on the RRU;
   a modulator configured to modulate the control signal with a control carrier;
   a transmit filter configured to filter the modulated control signal; and
   a combiner configured to combine the data signal and the filtered modulated control signal to generate a combined signal and send the combined signal to the RRU via a physical channel.

2. The transceiver unit of claim 1, wherein the transmit filter comprises one of a low pass filter and a band pass filter.

3. The transceiver unit of claim 2, wherein the modulator is configured to perform one of on-off keying (OOK) modulation, amplitude shift keying (ASK) modulation, and single side band (SSB) modulation.

4. The transceiver unit of claim 1, wherein the transceiver unit further comprises:
   a directional coupler configured to receive a second combined signal from the RRU and split the second combined signal into first and second signals;
   a first receive filter configured to receive the first signal from the directional coupler and extract data from the first signal; and
   a demodulator configured to receive the second signal from the directional coupler via a second receive filter, wherein the demodulator is configured to extract RRU control information or RRU status information from the second signal.

5. The transceiver unit of claim 4, wherein the second combined signal comprises a plurality of received data signals from the RRU.

6. The transceiver unit of claim 4, wherein the second receive filter comprises one of a low pass filter and a band pass filter.

7. The transceiver unit of claim 6, wherein the demodulator is configured to perform at least one of on-off keying OOK) demodulation, amplitude shift keying (ASK) demodulation, and single side band (SSB) demodulation.

8. The transceiver unit of claim 1, wherein the RRU comprises
   a controller configured to control the analog components within the RRU according to the control information.

9. The transceiver unit of claim 8, wherein the RRU further comprises:
   an antenna for receiving data;
   a second modulator configured to receive RRU control information and RRU status information from the controller and modulate the RRU status information with a carrier signal generated by a carrier and clock generator; and a second combiner configured to combine the modulated status information and the received data into a single signal as a second combined signal for transmission to the transceiver unit via a second physical channel.

10. The transceiver unit of claim 9, wherein the carrier and clock generator comprises a FPGA clock generator.

11. The transceiver unit of claim 8, wherein the controller comprises a field programmable gate array (FPGA).

12. The transceiver unit of claim 1, wherein the data signal comprises a plurality of data signals for transmission to the RRU.

13. A method in a transceiver unit for controlling a remote radio unit (RRU) in a massive multiple input, multiple output (MIMO) wireless communication system, the method comprising:
   generating a data signal and a control signal by a digital transceiver;
   modulating, by a modulator, the control signal with a control carrier to produce a modulated control signal, wherein the control signal comprises one of control information to control analog components on the RRU in the massive MIMO wireless communication system and status information about the analog components on the RRU;
   filtering the modulated control signal;
   combining, by a combiner, the filtered modulated control signal and the data signal to produce a combined signal; and
   transmitting the combined signal to the RRU via a physical channel.

14. The method of claim 13, further comprising:
   receiving a second combined signal from the RRU via a second physical channel, wherein the second combined signal comprises a received data signal and one of RRU control information and RRU status information;
   splitting the second combined signal through a directional coupler into a first signal and a second signal;
   passing the first signal through a band pass filter to obtain the received data signal; and
   passing the second signal through a low pass filter or a band pass filter and a demodulator to obtain one of the RRU control information and the RRU status information.

15. The method of claim 13, wherein modulating the control signal comprises using one of on-off keying (OOK) modulation, amplitude shift keying (ASK) modulation, and single side band (SSB) modulation.

16. The method of claim 13, wherein filtering the modulated control signal comprises low pass filtering or band pass filtering the modulated control signal.

17. A method in a transceiver unit for receiving RRU control information or RRU status information from a remote radio unit (RRU) in a massive multiple input, multiple output (MIMO) wireless communication system, the method comprising:
   receiving, at the transceiver unit, a combined signal from the RRU in the massive MIMO wireless communication system on a physical channel, wherein the combined signal comprises data and one of RRU control information for controlling analog components on the RRU and RRU status information about the analog components on the RRU;
   splitting, by the transceiver unit, the combined signal through a directional coupler into a first signal and a second signal;
   processing, by the transceiver unit, the first signal through a band pass filter and transmitting the data; and
   passing, by the transceiver unit, the second signal through a low pass filter or a band pass filter and a demodulator to obtain one of the RRU control information and the RRU status information.

18. The method of claim 17, further comprising:
   modulating, by a modulator in the transceiver unit, a control signal with a control carrier to produce a modulated control signal or a modulated status signal, the control signal including one of control information to control the analog components on the RRU and the status information about the analog components on the RRU;
   combining, by a combiner in the transceiver unit, the modulated control signal or the modulated status signal with a received data signal to produce a second combined signal; and
   transmitting, with the transceiver unit, the second combined signal to the RRU via a second physical channel.

19. The method of claim 18, wherein the modulated control signal or the modulated status signal comprises using one of on-off keying (OOK) modulation, amplitude shift keying (ASK) modulation, and single side band (SSB) modulation.

* * * * *